RADIO IMPULSE RECEIVER

Filed July 14, 1945 2 Sheets-Sheet 1

Inventor
J. CARL SEDDON
By Ralph L. Chappell
Attorney

Feb. 27, 1951 J. C. SEDDON 2,543,068

RADIO IMPULSE RECEIVER

Filed July 14, 1945 2 Sheets-Sheet 2

Inventor

J. CARL SEDDON

By Ralph L Chappell

Attorney

Patented Feb. 27, 1951 2,543,068

UNITED STATES PATENT OFFICE 2,543,068

RADIO IMPULSE RECEIVER

John Carl Seddon, Washington, D. C.

Application July 14, 1945, Serial No. 605,165

4 Claims. (Cl. 250—6)

(Granted under the act of March 3, 1883, as amended April 30, 1928; 370 O. G. 757)

This invention relates to impulse communication and is particularly directed to providing a receiver suitable for use as a component of a radio impulse communication system.

Wide fields of application have developed for communication systems employing trains of short-duration ratio impulses as a means of conveying intelligence. One of the most important applications of such systems is in communication between aircraft. Use of radio impulse communication between aircraft raises unique problems of great difficulty, however; it is to the solution of these problems that this invention is especially directed.

In radio communication between aircraft, enormous variations occur in the signal strength at the receiving point. The planes may be separated by a few feet or many miles. The position and attitude of one plane relative to the other, moreover, may greatly influence the strength of the received signal. In consequence the signal voltage at the input of the airborne receiver may vary from a few microvolts to a hundred volts or more within an interval of seconds.

The receiving problem is further complicated by the fact that the receiving antenna is excited not only by waves arriving by a direct path from the transmitting aircraft but also by waves which arrive from the transmitting plane after reflecting from the earth or other objects. Because they traverse a greater distance, the reflections of a given impulse always arrive at the receiver later than the wave impulse travelling over the direct path. Fortunately the reflections are usually much weaker than the direct-path signals, although on some occasions they are almost as strong.

The impulse trains employed in the communication systems under consideration are composed of individual high frequency impulses of rectangular envelope, the duration of a single impulse being usually of the order of ten microseconds. The interval between successive impulses may range from a few microseconds to minutes.

A receiver suitable for use in such systems should with high fidelity and accuracy reproduce in its output voltage the envelope of the signal as transmitted, notwithstanding the enormous range of signal strength encountered and the presence of the reflections which distort the signal envelope at the receiver's input. A receiver incorporating the principles of this invention will conform to that standard; it will discriminate very sharply against reflections and thus yield a video output voltage which is a faithful reproduction of the impulse envelope as transmitted. Moreover it will give output voltage of constant amplitude regardless of the variation of signal voltage within very wide limits; this latter property is desirable and important in some applications.

Previously existing receivers cannot meet satisfactorily the demands of airborne impulse communication service. No previous circuit design will cause the receiver to discriminate against reflection signals; on the contrary, if a receiver of conventional design is made sensitive enough to respond to signals of a few microvolts, the receiver is saturated by the enormously strong signals and reflections which occur when the planes are close together. Consequently the output voltage waveform in a conventional receiver often fails entirely to differentiate between direct-path signals and reflections. Automatic volume control circuits are not helpful because they respond to the average value of the signal voltage after detection, and thus cannot be used in impulse systems except when the impulse repetition rate is high and relatively constant. As was previously pointed out, the impulse repetition rate in systems of the type under consideration may vary from a very high value to practically zero.

It is accordingly an object of this invention to provide a radio impulse communication system incorporating an improved receiver circuit.

Another object of this invention is to provide a receiver for the reception of radio impulses which will effectively discriminate between impulses traversing a direct path from the transmitter and reflections thereof traversing an indirect path from the transmitter, accepting the former and rejecting the latter.

Still another object of this invention is to provide a receiver for the reception of radio impulse signals which will faithfully reproduce the envelope of the impulse signals as transmitted while giving substantially constant amplitude output voltage for all signal input voltages from a few microvolts to one hundred volts or more.

The receiver comprising this invention is of the superheterodyne type, and its novel features lie in the circuits employed in the radio frequency amplifier, mixer, and intermediate frequency amplifier components. The local oscillator, detector, and video amplifier components may be of conventional design.

The invention will be further described with reference to the appended drawings of which, Figure 1 is a diagram, partly schematic and partly in block form, of a radio impulse communication system embodying the principles of the invention; and Figures 2 to 8 inclusive are oscillograms of various voltages and currents useful in effecting an understanding of the invention's operation.

Referring to Figure 1, a radio impulse transmitter 1 is shown in block form. The receiver shown is of the superheterodyne type. Signal voltage induced in antenna 2 by transmitter 1 is passed to the control grid of radio frequency amplifier tube 10 through tuned coupling transformer 3. One side of the secondary coil of transformer 3 is returned to ground through the R. C. circuit comprising condenser 16 and resistor 15 in parallel. The cathode of tube 10 is held at a constant potential above ground by the cathode biasing circuit comprising resistor 18 and condenser 19 in parallel.

The output of tube 10 is coupled to the control grid of mixer tube 20 by tuned coupling transformer 13. Voltage generated by local oscillator tube 90 is also coupled to the control grid of mixer tube 20 through small condenser 91. The control grid of tube 20 is returned to ground through the secondary coil of transformer 13 and the R. C. circuit comprising condenser 26 and resistor 25 in parallel. Constant cathode bias for tube 20 is provided by the biasing circuit comprising resistor 28 and condenser 29 in parallel. The plate load circuit of mixer tube 20 is of a type conventional in receivers designed for reception of short impulses; plate load resistor 22 is connected in shunt, for high frequency currents, with the primary coil of coupling transformer 23; coupling transformer 23 is tuned to the intermediate frequency which is the difference between the signal frequency and the local oscillator frequency. One side of the secondary coil of transformer 23 is connected to the control grid of intermediate frequency amplifier tube 30; the other side is returned to ground through the R. C. circuit comprising condenser 36 and resistor 35 in parallel. Constant cathode bias for tube 30 is provided by resistor 38 and condenser 39 in parallel. The plate of tube 30 is coupled to the grid of the second I. F. amplifier tube 40 with a network similar to that employed to couple tube 20 to tube 30.

Tubes 40, 50, 60 and 70 are respectively the 2nd, 3rd, 4th, and 5th intermediate frequency amplifier tubes. The circuits in which they are connected are identical to the circuit associated with tube 30, the first I. F. amplifier tube. In each I. F. stage the control grid is returned to ground through an R. C. network similar to those used in association with tubes 10, 20, and 30; these R. C. circuits comprise condenser 46 and resistor 45 for the second I. F. stage, condenser 56 and resistor 55 for the third I. F. stage, condenser 66 and resistor 65 for the fourth I. F. stage, and condenser 76 and resistor 75 for the fifth I. F. stage. The time constants of these circuits may all be equal or they may vary one from another, as will be discussed in detail in a later paragraph.

All the intermediate frequency amplifier stages are likewise supplied with constant cathode bias through the use of cathode resistors and by-pass condensers, as in the amplifier stages already described. The cathode biasing circuits for the 2nd, 3rd, 4th and 5th I. F. stages are respectively condenser 49 and resistor 48, condenser 59 and resistor 58, condenser 69 and resistor 68, and condenser 79 and resistor 78. The cathode biasing circuits of all the amplifier stages may be identical; their time constants are so great that the cathode-to-ground potential of each tube is essentially constant. Tubes 10, 20, 30, 40, 50, 60 and 70 are all sharp cut-off tubes, and the fixed grid to cathode bias on all of them, in the absence of a signal, is set by the cathode biasing circuits to a negative value approximately midway between zero and cut-off bias.

In the receiver shown in Figure 1, the fifth intermediate frequency amplifier tube 70 is coupled to a detector tube 80, connected in the conventional circuit known as the infinite impedance detector. The video voltage appearing at detector output terminals 81 and 82 may be applied to a suitable video amplifier or load circuit.

Signal voltage induced in antenna 2 will comprise high frequency oscillations whose modulation envelope includes both the desired impulse envelope as transmitted and in addition spurious components introduced by reflections. This signal will be linearly amplified by the successive stages—the R. F. amplifier, the mixer, the first I. F. amplifier, etc—until the signal level is amplified to such a point that the grid of an amplifier tube is driven positive relative to its cathode on the peaks of the high-frequency signal cycles. How many stages of amplification the signal must pass through before this occurs depends on the initial value of the signal. If its initial value is very high, the grid of the R. F. amplifier tube might be driven positive. On a very weak signal, the fourth or fifth I. F. amplifier might be reached before the signal reaches a level such that a grid goes positive. In any event those amplifier tubes which encounter low-level signals operate linearly and amplify the signal without affecting the shape of its envelope—the reflections are amplified equally with the main signal impulses and the signal to reflection ratio is unaffected. In these stages, moreover, the R. C. circuits in the grid returns do not affect the amplifier operation, since no direct current flows through them and the condensers do not charge.

When the control grid of an amplifier tube is driven positive relative to the cathode by a signal impulse, however, the condenser in the grid return circuit of the tube is very rapidly charged by the grid current that flows during the positive peaks. The only resistance of consequence in the charging circuit is the grid-to-cathode resistance of the tube when the grid is positive relative to its cathode. This is a low resistance of the order of 1000 ohms in most receiving tubes, and as a result the grid condenser charges almost to the peak signal voltage during a single signal impulse. This results in the grid bias on that tube becoming more negative than normally—to a value below plate current cutoff if the peak signal voltage is substantially more than the grid voltage required to cut off plate current in the tube, or in any event to a value of bias at which the tube's gain is lower than at normal bias.

The direct-path signal impulse is followed by reflection signals whose amplitude is smaller, usually much smaller, than that of the direct-path signals. The condenser in the grid return circuit holds its charge for a substantial number of microseconds, since its discharge path is through the relatively large resistor in parallel with it. As a result the reflection signals encounter a tube which is either biased entirely below cutoff or biased into a relatively insensitive region, and the plate current of the tube in question either contains no reflection signal components at all or contains reflection components relatively much weaker than in the voltage applied to the grid.

If the reflection signal components are not entirely removed in the first discriminating tube, the amplified signal voltage which it applies to the succeeding tube will be large enough to charge the grid condenser of the following stage to a value of voltage such that the following tube will be biased far below cutoff, so that any reflection components that get through the first discriminating tube are eliminated entirely in the second discriminating tube, which is the stage next following.

Although the grid condenser charge built up by the first impulse remains substantial for perhaps one hundred microseconds or more, direct-path impulses closely following the first one are passed through and amplified by the discriminating tube, since they are stronger than the spurious reflection signals and can thus drive the grid above cutoff during the positive half-cycles.

The discriminating tubes perform another function, in addition to suppressing reflection signals. By reason of the low impedance of the grid-to-cathode path of the tube when the grid is positive, the grid tank circuits are unable to drive the grid more than slightly positive, and as a result the top of the signal envelope is clipped, thus tending to remove from the top of the signal envelope any irregularities that might have been impressed thereon as a result of a direct path impulse arriving at the antenna simultaneously with a reflection signal of a previous impulse. The discriminating tube or tubes, therefore, give an output voltage consisting of high frequency impulses of rectangular envelope, free from irregularities or distortion and with the same impulse durations and spacing that the impulse train possessed when transmitted.

The amplifier tubes following the discriminating tubes function as saturated class C amplifiers, since the signal applied to each of them is large enough to cause grid conduction on the signal peaks and thus to charge the grid condensers to a value of bias greater than cutoff. In consequence the output voltage applied to the detector is held at a constant amplitude, regardless of the strength of the signal at the antenna.

The discharge time constants are short enough to allow restoration of full sensitivity to any discriminating tube or any tube operating as a saturated amplifier within a few hundred microseconds. A substantial variation in the strength of the main signals therefore simply causes the tubes to pass the discriminating function from one to another. If the signal grows weaker over a period of a second or several seconds, the tube which was formerly discriminating against reflections resumes its functions as a linear amplifier, since the signal at its grid no longer drives the grid positive on the peaks; and the discriminating function is taken over by succeeding tubes in the amplifier. If on the other hand the signal at the antenna greatly increases in intensity, the signal voltage becomes great enough to drive the grid of a preceding tube positive and the original discriminating tube either starts to operate as a saturated amplifier or perhaps performs secondary discrimination, suppressing any reflection components that get by the first discriminating tube.

The signal, then, can swing back and forth between tremendously high levels and very low levels, and the receiver continues to give precisely the same amplitude of output voltage; moreover the envelope of the signal fed to the detector is a faithful reproduction of the envelope as transmitted. This extraordinary versatility is one of the most remarkable properties of the invention; any one of the tubes in the amplifier automatically functions as a linear amplifier, discriminating tube, or saturated amplifier as may be required by the strength of the signal at a given time.

The receiver's performance may best be further illustrated with reference to Figures 2 to 8 inclusive. These figures are oscillograms of various voltages and currents; they are all drawn to the same horizontal time scale, but the vertical scale varies from figure to figure and is in no case quantitatively calibrated. In all the figures vertical shading indicates oscillations of signal or intermediate frequency too high to show individual cycles on this time scale, so that only the modulation envelopes can be seen.

Figure 1:
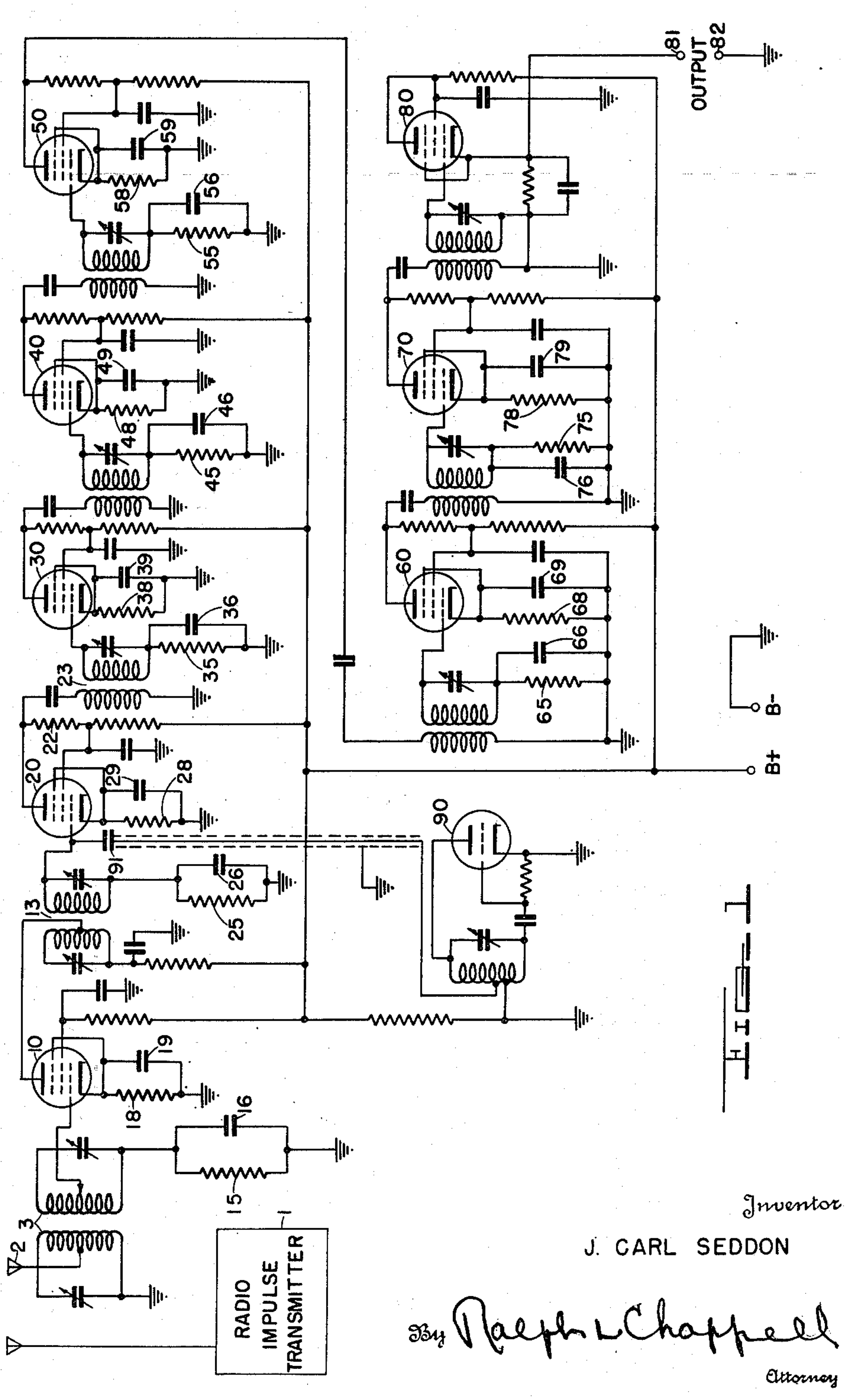
Figure 2:
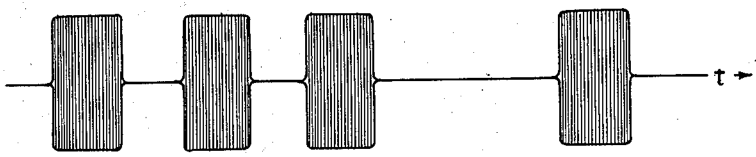
Figure 2 is an oscillogram showing how the voltage induced in receiving antenna 2 might vary during a typical interval of time if no reflections were occurring. Visible in Figure 2 are the envelopes of four rectangular impulses, which together might form a typical impulse-train radiated by impulse transmitter 1.
Figure 3:
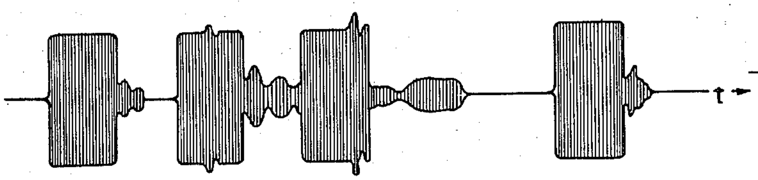
Figure 3 shows the same four impulses as they might actually appear at the receiving antenna. Note that the modulation envelope is badly distorted as a result of reflections.
Figure 4:
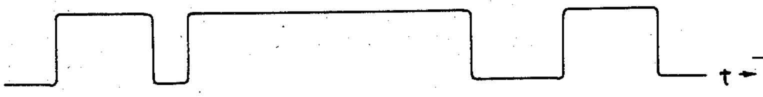

Figure 4 shows the video waveform that would result if the reflection-distorted signal of Figure 3 were amplified in a conventional receiver, limited to achieve uniform voltage amplitude, and then detected. The waveform shown in Figure 4 obviously bears no resemblance to the modulation envelope in Figure 2, which is the standard to which it should conform for proper operation of the signalling system.

Figure 5:
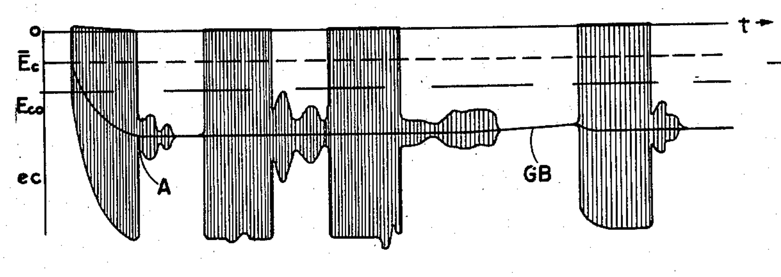

To illustrate graphically how a receiver incorporating the principles of this invention operates to discriminate against reflections and eliminate distortion introduced by them, Figure 5 shows the grid to cathode voltage of the tube in the receiver which, for the particular signal shown in Figure 3, is acting as discriminating tube. The main horizontal axis of Figure 5 indicates zero grid voltage, relative to cathode. The horizontal dotted line below the zero axis denotes the fixed value of grid bias, and is marked $\overline{E}_c$. The second interrupted horizontal line below the zero axis represents that value of grid bias at which the plate current of the tube is cut off. This line is marked $E_{co}$.

Assuming that no signal impulses have been received for several hundred microseconds, the grid voltage of the tube at the instant the first impulse starts is at the fixed bias value, $\overline{E}_c$. The high frequency variations in voltage occasioned by the first signal impulse are shown by the shaded envelope; these oscillations drive the grid into a positive region at the peak of each cycle; grid current flows at those times, and the grid condenser is charged by the grid current. As a result the bias, or grid voltage averaged over a high frequency cycle, shown by the solid line marked GB, begins at once to assume more negative values. The grid condenser charges rapidly through the low grid-to-cathode tube resistance, and by the end of the first impulse the grid bias has reached the value shown at point A—substantially more negative than the cut-off bias $E_{co}$, and approximately equal to the peak voltage of the high-frequency signal.

When the direct-path impulse ends, the grid bias does not return to its original value at the same rate at which it built up, since the grid condenser cannot discharge through the tube and must lose its charge through its parallel-connected resistor. This discharge occurs much more slowly than the charging process; hence the grid bias remains at a value more negative than cutoff for a considerable number of microseconds after the end of the first impulse. The oscillations attributable to reflection signals vary the grid voltage, as shown in Figure 5, but do not, it should be observed, raise the net grid voltage above cutoff at any time.

The second direct-path impulse, however, being as strong as the first one, of course drives the grid up to zero again at the peaks of its high-frequency cycles, just as did the first impulse. Note, however, that the top of the envelope of the second impulse does not drive the grid appreciably above zero; this occurs because of the low tube impedance when the grid is positive, and results in the smoothing off of irregularities in the top of the impulse envelope.

It should be observed that between the third and fourth direct-path impulses a longer time intervenes than between the preceding ones and as a result the grid bias may be seen to have become appreciably less negative by the initiation of the fourth impulse, indicating that the grid condenser is discharging. When the fourth impulse starts it again drives the grid positive on the peaks of its cycles and quickly recharges the grid condenser, as shown by the drop in the grid bias line after the starting time of the fourth impulse. If no additional impulses followed the fourth one for several hundred microseconds, the grid condenser would discharge through its associated resistor and the grid bias would return along an exponential path to the value $\overline{E}_c$.

Figure 6:
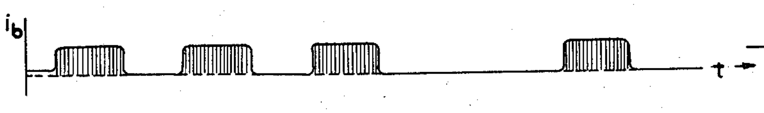

Figure 6 shows how the plate current of the discriminating tube would vary during the interval of time covered by the graphs. Plate current flows, of course, only during those intervals in which the grid voltage is above the cut-off value. Hence a very short burst of plate current flows during the positive portion of each high frequency cycle occurring during the direct path signal impulses. No plate current flows while reflections are being received because the instantaneous grid voltage does not get above cutoff at any time during their duration. Therefore the envelope of plate current bursts is as shown in Figure 6—rectangular impulses of current coinciding in time with the direct-path signals, and zero current between direct path signals.

Figure 7:
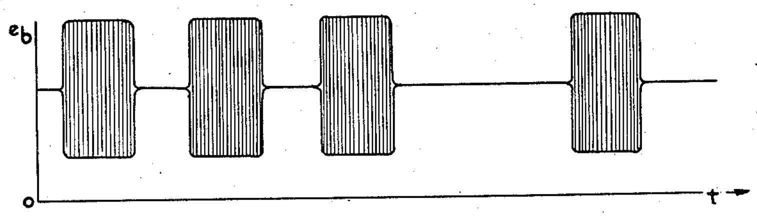

Figure 7 shows the envelope of high-frequency voltage induced by the plate current of Figure 6 in the grid tank circuit of the tube following the discriminating tube; the envelope, it will be noted, is a faithful reproduction of the envelope of the impulse train as transmitted.

Figure 8:
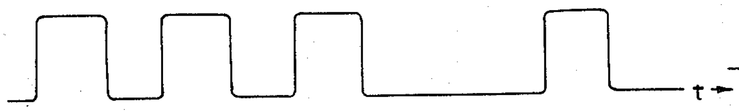

Figure 8 is a graph showing the distortion-free video voltage waveform resulting from the detection of the high-frequency voltage illustrated in Figure 7.

Determination of optimum values for the grid-condensers and grid-resistors used in the invention involves several considerations. The condensers should in all cases be of a capacitance such that they will charge almost completely during a single direct-path impulse. The charging resistance, as stated before, is the grid to cathode tube resistance, which is in general quite low when the grid is positive relative to the cathode. In a particular construction used in a system employing ten microsecond impulses, values of grid condenser from .0005 microfarad to .006 microfarad were found to be satisfactory.

Since the condenser size is fixed within certain limits by the charging time requirements, the discharge time constant must be fixed by proper choice of the shunt resistor. So far as suppression of reflections goes, there is no upper limit on the discharge time constant, but two other considerations govern its maximum practical value; first, the tube's grid bias must be able to vary rapidly enough to let the receiver follow changes in the strength of direct-path signals; and, second, instability and regeneration occasioned by excessive grid circuit resistance must be avoided.

In general the receiver should be able to adjust itself to changes in signal level within a few hundred microseconds; hence none of the R. C. circuits in the grid returns should have time constants exceeding one or two hundred microseconds. Such circuits will hold their charge amply long enough to suppress reflections. It has been found, however, in some receivers, that if the grid returns in stages near the input end of the amplifier have time constants of one hundred microseconds or more, instability and oscillation may result from the high resistance in the grid circuits. Fortunately the R. C. circuits in the stages near the input need not have particularly long time constants, since those stages act as discriminating stages only when the signals are enormously strong and hence when the receiver and transmitter are very close together. When only a short distance separates receiver and transmitter, the only reflections of significant amplitude are those arriving very soon after the direct-path impulses. Accordingly, an arrangement highly satisfactory in practice has been to stagger the time constants, starting with values about 30 microseconds in the first stage or two and running up to values of about 200 microseconds in the last two or three stages. Where a staggered arrangement is employed, the condensers should be of the same order of magnitude throughout, and the smaller time constants in the stages near the input should be obtained by reducing the magnitude of the grid resistors.

It will be understood that the embodiment of the invention herein shown and described is exemplary only, and that the scope of the invention is to be determined from the appended claims.

The invention described herein may be manufactured and used by or for the Government of the United States of America for governmental purposes without the payment of any royalties thereon or therefor.

What is claimed is:

1. An impulse receiving system tuned to receive discrete impulses transmitted along a direct path from a remote point on a predetermined fixed carrier frequency and to reject reflections of said impulses from surrounding objects, comprising, a plurality of cascaded amplifier stages, each stage having a vacuum tube with a control grid, an antenna coupled to the control grid of the first of said amplifier stages, a grid blocking return circuit connected to the control grid of each of the tubes including the first comprising an energy storage means connected to the control grid of the respective tube having a value operative to respond to the flow of grid current during receipt of a single direct path impulse to develop immediately following the cessation of such direct path impulse, a blocking bias for the control grid drawing current and to discriminate against weaker signals subsequently received, and discharge means connected to said storage means to dissipate the energy stored therein within a predetermined time interval following receipt of a direct path impulse.

2. An impulse receiving system tuned to receive discrete impulses transmitted along a direct path from a remote point on a predetermined fixed carrier frequency and to reject reflections of said impulses from surrounding objects, comprising, a plurality of cascaded amplifier stages each stage having a vacuum tube with a control grid, an antenna coupled to the control grid of the first tube, a separate slow recovery gain control circuit connected to the control grid of each tube including the first comprising a parallel resistance capacitance circuit responsive to the flow of grid current during receipt of a single direct path impulse to develop, immediately following the cessation of such direct path impulse, a blocking bias for the control grid drawing grid current, said resistance and capacitance having values selected to form a time constant much greater than the time duration of the received impulses whereby weaker signals received within a predetermined time interval following said direct path impulses are rejected.

3. An impulse receiving system tuned to receive discrete impulses transmitted along a direct path from a remote point on a predetermined fixed carrier frequency and to reject reflections of said impulses from surrounding objects, comprising, a plurality of cascaded amplifier stages each having a vacuum tube with a control grid, means providing the vacuum tube of each of said stages with a zero signal bias suitable to produce linear operation thereof, an antenna coupled to the control grid of the first of said tubes, a separate slow recovery gain control circuit connected to the control grid of each of said tubes including the first comprising a parallel resistance capacitance circuit responsive to the flow of grid current during receipt of a single direct path impulse to develop, immediately following cessation of such impulse, a blocking bias for the control grid drawing grid current, said resistance and capacitance having values selected to form a time constant much greater than the time duration of the received impulses whereby weaker signals received within a predetermined time interval following said direct path impulse are rejected.

4. The apparatus defined in claim 3 wherein the time constant of the gain control circuits of the initial stages of the receiving system is smaller than that of the gain control circuits of the final stages of the system.

J. CARL SEDDON.

REFERENCES CITED

The following references are of record in the file of this patent:

UNITED STATES PATENTS

| Number | Name | Date |
|---|---|---|
| 2,167,492 | Sproule | July 25, 1939 |
| 2,223,995 | Kotowski et al. | Dec. 3, 1940 |
| 2,225,524 | Percival | Dec. 17, 1940 |
| 2,241,170 | Ulbricht | May 6, 1941 |
| 2,289,840 | Herz | July 14, 1942 |
| 2,334,468 | Adams | Nov. 16, 1943 |
| 2,361,437 | Trevor | Oct. 31, 1944 |
| 2,388,544 | Holst et al. | Nov. 6, 1945 |
| 2,406,019 | Labin | Aug. 20, 1946 |
| 2,411,572 | Hershberger | Nov. 26, 1946 |
| 2,416,304 | Grieg | Feb. 25, 1947 |
| 2,422,122 | Norton | June 10, 1947 |
| 2,425,314 | Hansell | Aug. 12, 1947 |
| 2,435,960 | Fyler | Feb. 17, 1948 |

FOREIGN PATENTS

| Number | Country | Date |
|---|---|---|
| 438,568 | Great Britain | Nov. 4, 1935 |
| 474,690 | Great Britain | Nov. 5, 1937 |